United States Patent
Harrison et al.

(10) Patent No.: US 6,285,953 B1
(45) Date of Patent: Sep. 4, 2001

(54) MONITORING VEHICLE POSITIONS

(75) Inventors: Christopher G. Harrison, Manchester; Jeffrey C. Morris, Leeds, both of (GB)

(73) Assignee: MinorPlant Limited, West Yorkshire (GB)

( * ) Notice: Subject to any disclaimer, the term of this patent is extended or adjusted under 35 U.S.C. 154(b) by 0 days.

(21) Appl. No.: 09/254,879

(22) PCT Filed: Sep. 16, 1997

(86) PCT No.: PCT/GB97/02522

§ 371 Date: Jun. 7, 1999

§ 102(e) Date: Jun. 7, 1999

(87) PCT Pub. No.: WO98/11522

PCT Pub. Date: Mar. 19, 1998

(30) Foreign Application Priority Data

Sep. 16, 1996 (GB) .................................. 9619315
Jul. 11, 1997 (GB) .................................. 9714592

(51) Int. Cl.[7] .................................................. G01C 21/26
(52) U.S. Cl. .................. 701/213; 701/214; 340/988; 342/357.01; 342/357.08; 342/450
(58) Field of Search .................... 701/213, 214, 701/215; 340/988, 990, 995; 342/42, 46, 357.01, 357.06, 357.07, 357.08, 357.09, 450, 47

(56) References Cited

U.S. PATENT DOCUMENTS

| 5,023,798 | 6/1991 | Neukirchner et al. | 701/207 |
| 5,251,078 | 10/1993 | Aki et al. | 360/72.2 |
| 5,289,369 | * 2/1994 | Hirshberg | 705/13 |

FOREIGN PATENT DOCUMENTS

| 0 604 404 A | 6/1994 | (EP) . |
| 0604404 A2 | 6/1994 | (EP) . |

* cited by examiner

Primary Examiner—William A. Cuchlinski, Jr.
Assistant Examiner—Yonel Beaulieu
(74) Attorney, Agent, or Firm—Nixon & Vanderhye P.C.

(57) ABSTRACT

A data monitoring apparatus uses a GPS receiver, micro controller, a plurality of sensors and actuators, a memory, a radio transmitter and a data communication antennae. The apparatus accumulates real-time data concerning position and time and other operational parameters of a geographically mobile object for example a vehicle for transmission to a monitoring station. Transmission channel utility may be improved through transmission of accumulated historical data to a separate monitoring station.

42 Claims, 11 Drawing Sheets

| Bit | DATE | START TIME | STOP TIME | ABSOLUTE LATITUDE | ABSOLUTE LONGITUDE | RELATIVE LAT/LONG |
|---|---|---|---|---|---|---|
| 0 | Y | S | S | T | G | G |
| 1 | Y | S | S | T | G | G |
| 2 | Y | S | S | T | G | G |
| 3 | Y | S | S | T | G | G |
| 4 | Y | S | S | T | G | G |
| 5 | Y | S | S | T | G | G |
| 6 | Y | M | M | T | G | G |
| 7 | Y | M | M | T | G | G |
| 8 | M | M | M | T | G | G |
| 9 | M | M | M | T | G | G |
| 10 | M | M | M | T | G | G |
| 11 | M | M | M | T | G | T |
| 12 | D | H | H | T | G | T |
| 13 | D | H | H | T | G | T |
| 14 | D | H | H | T | G | T |
| 15 | D | H | H | T | G | T |
| 16 | D | H | H | T | G | T |
| 17 | 1 | 1 | 0 | T | G | T |
| 18 | 0 | 1 | 1 | T | G | T |
| 19 | 0 | 0 | 0 | T | G | T |
| 20 | 0 | 0 | 0 | T | G | T |
| 21 | 0 | 0 | 0 | T | G | T |
| 22 | 0 | 0 | 0 | 0 | 1 | 1 |
| 23 | 0 | 0 | 0 | 1 | 1 | 0 |

601 — DATE
602 — START TIME
603 — STOP TIME
604 — ABSOLUTE LATITUDE
605 — ABSOLUTE LONGITUDE
606 — RELATIVE LAT/LONG
607

Figure 6

| PERIODIC STIMULI | APERIODIC STIMULI |
|---|---|
| GPS SERIAL DATA (1 Hz) | IGNITION |
| TEMPERATURE SENSORS (1 Hz) | ALARM CONDITIONS:<br>    TEMPERATURE<br>    PETROL<br>    DOOR OPENING |
| VEHICLE SPEED (1 Hz) | |

Figure 9

MONITORING VEHICLE POSITIONS

BACKGROUND OF THE INVENTION

1. Field of the Invention

A method and apparatus for monitoring the position of a vehicle or group of vehicles.

2. Related Art

Global positioning systems (GPS) are known in which a plurality of satellites in earth orbit are arranged to transmit signals such that a receiver located on the earth's surface is able, by triangulation techniques, to identify its location. Advances in such systems have resulted in them being included in small and relatively low cost equipment. As a result such technology is now in wide spread use in diverse equipment, for example for identification of the position of one or more vehicles.

British patent publication number 2 288 892 describes a system in which the position of a road vehicle is monitored by transmitting GPS positional data from a GPS system located on the vehicle to a base station. The data is transmitted using a radio link or GSM data link. Data is transmitted at closely spaced regular intervals so as to provide substantially real-time tracking of the vehicle.

With the system described in British patent publication number 2 288 892, the interval between successive transmission events must be relatively short in order to enable a remote monitoring station to obtain such real-time tracking data. Thus, a communication channel may be continuously kept open, tying up the channel, or opened and closed at short intervals, in which case the transmission time overhead of the protocol exchanges in creating the channel is significant in relation to the actual transmission time required for transmission of positional data. Such substantially constant use of a communications channel is expensive and can be inefficient e.g. in areas of poor reception.

French patent publication number 2 670 002 discloses the determination of vehicle position based on satellite signals from which vehicle position is calculated. A situation is described in which the satellite signals may be lost, possibly due to a vehicle entering a tunnel etc. Under these circumstances, subsequent vehicle positions are calculated by means of direction and distance measuring sensors. However, the document does not address the problem of facilitating the storage of a significant volume of positional data and is concerned primarily with providing current positional data to a driver.

SUMMARY OF THE INVENTION

According to a first aspect of the present invention, there is provided a method of monitoring a geographically moveable object, comprising the steps of substantially continuously receiving geographic position data at said geographically moveable object; and recording a first set of data representing the absolute geographic position of said object at a first position, characterised by creating relative position data from the difference between the absolute position data of a given position and the position data of a preceding recorded position; and recording a second set of position data representing said second position of said object relative to said first position.

In a preferred embodiment, subsequent sets of relative position data are recorded representing subsequent positions of said object relative to a preceding recorded position.

Preferably, the absolute position data comprises two n-bit words, where n may equal, for example, twenty-two and the relative position data comprises one n-bit word. Preferably, corresponding time and date data are associated with the position data.

According to a second aspect of the present invention, there is provided apparatus for monitoring a geographically moveable object, comprising means for substantially continuously receiving geographic position data at said geographically moveable object; and means for recording a first set of data representing the absolute geographic position of said object at said first position, characterised by means for creating relative position data from the difference between an absolute position data of a given position and the position data of a preceding recorded position; and means for recording a second set of position data representing a second position of said object relative to said first position.

In a preferred embodiment, the apparatus is arranged to record position data at intervals ranging from thirty seconds to thirty minutes and preferably the data is recorded at intervals ranging from two minutes to ten minutes.

In a preferred embodiment, the moveable object is a vehicle and the recording of data is initiated by the vehicle ignition being activated.

In a preferred embodiment, the apparatus includes means for transmitting recorded data to a base station to provide a history of the movement of the object at said base station. Preferably, position data is transmitted in response to a signal generated as a result of an operation of the moveable object, possibly in response to the ignition being deactivated.

BRIEF DESCRIPTION OF THE DRAWINGS

Referring to the drawings herein;

FIG. 6 illustrates the format of data accumulated by the data collection shown in FIG. 3;

FIG. 9 lists a selection of stimuli initiating processes of the preferred method;

DETAILED DESCRIPTION OF A PREFERRED EMBODIMENT

A preferred embodiment and method according to the invention will now be described by way of example only with reference to the accompanying drawings identified above.

Figure 1:
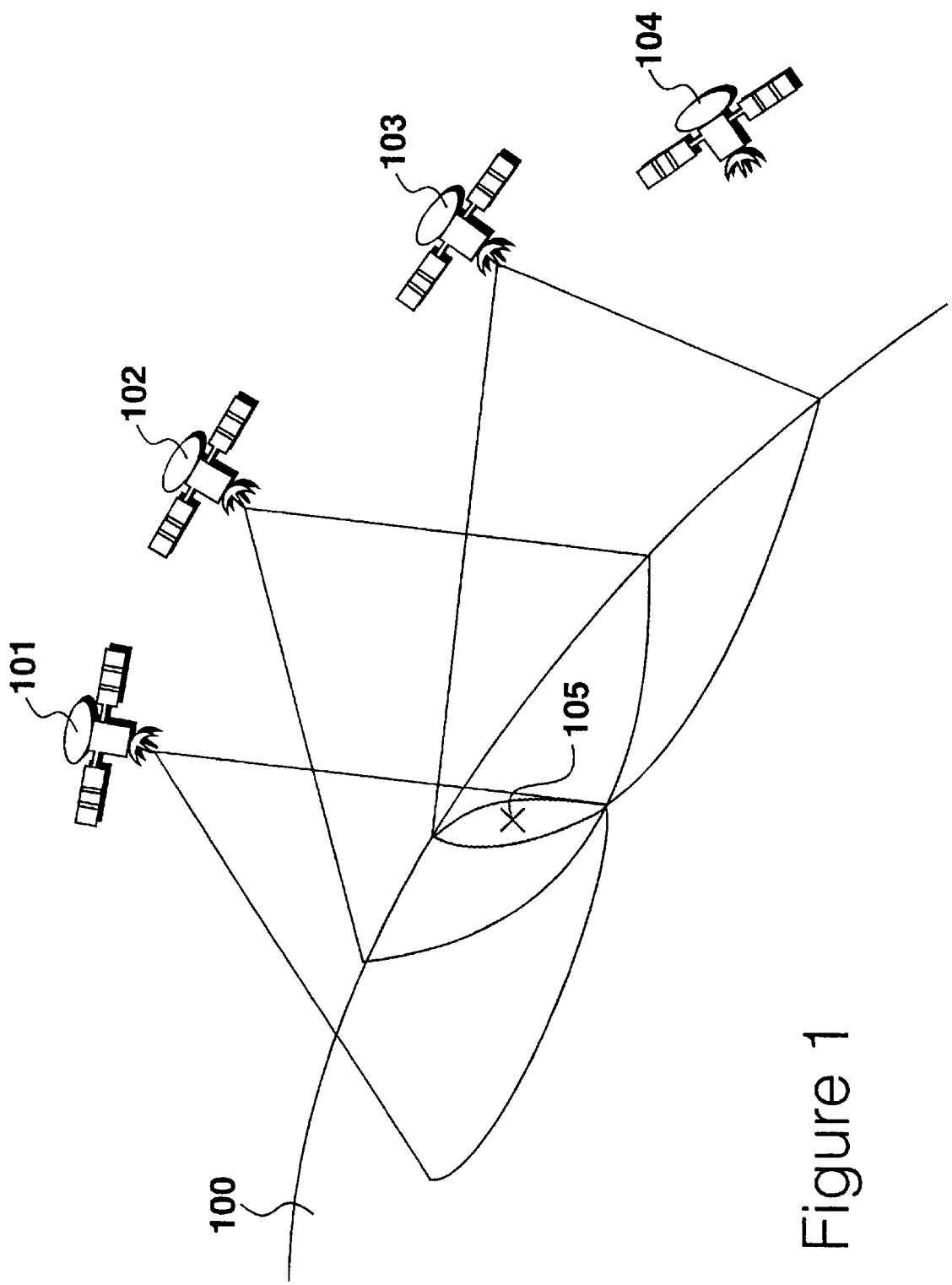
FIG. 1 illustrates a plurality of global positioning satellites in orbit around the earth.

FIG. 1 illustrates a section of the earth's surface 100, around which are continuously orbiting 24 operational satellites including 3 spare satellites of the Navstar type space based radio navigation system satellites developed by the US Department of Defence. The satellites are placed in six orbital planes at a distance of around 20,200 kilometres above the earth's surface. The satellites orbit with a 12 hour orbital period and an inclination angle of 55°. Each satellite continuously broadcasts an RF signal at a centre frequency of 1575.42 MHz (L1 Band). The RF signal is modulated by a 10.23 MHz clock rate precise ranging signal, and by a 1.023 MHz clock rate coarse acquisition code ranging signal. At any one time at a position 105 on the surface of the earth, a minimum of 5 satellites are in line of sight view.

At the point 105 on the earth's surface, there are at least three satellites within direct line of sight and therefore it is possible for a GPS receiver equipment positioned at that point 105 to calculate the precise geographical position of the point 105 by means of the RF signals transmitted by the satellites.

Figure 2:
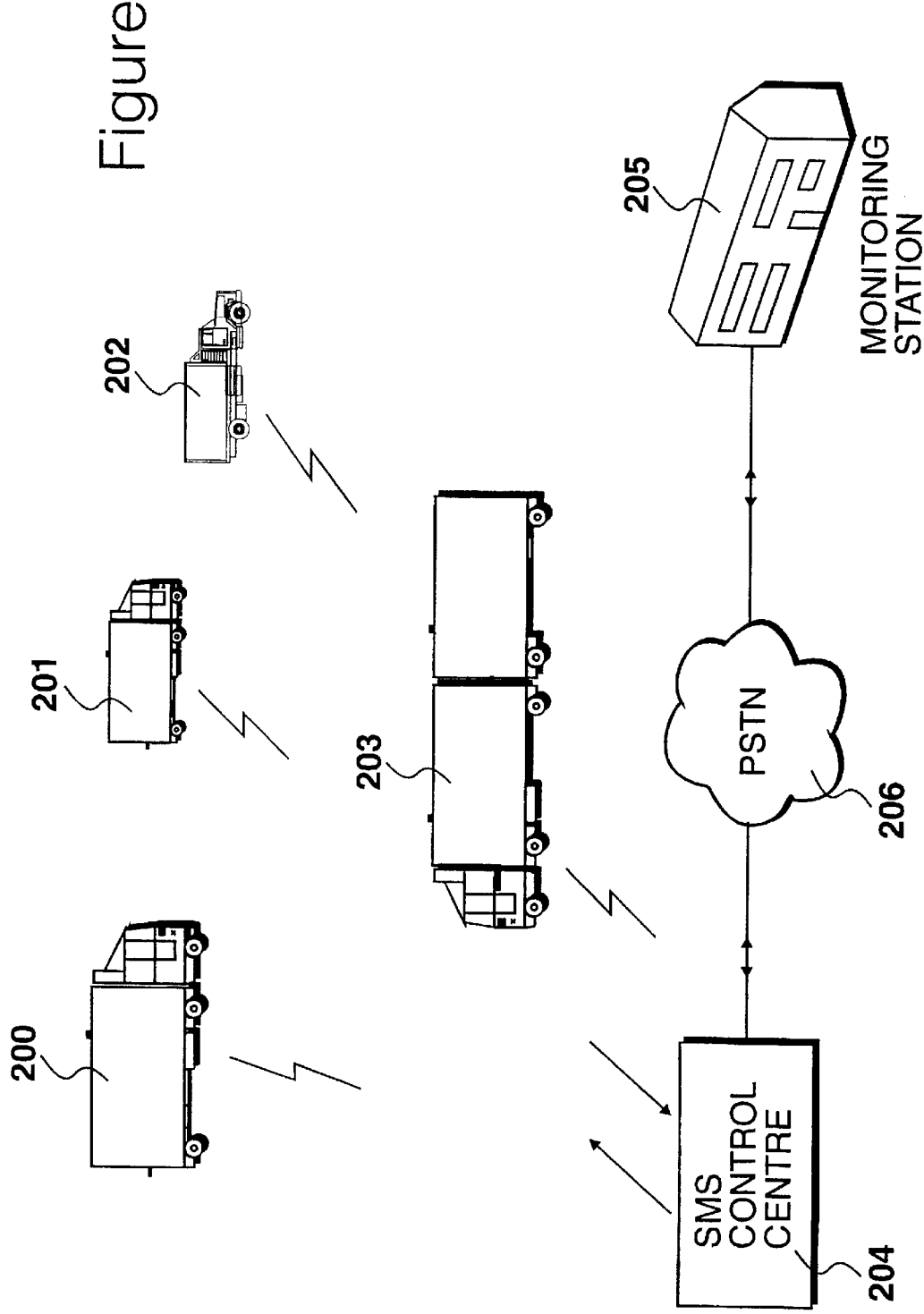
FIG. 2 illustrates a plurality of moveable vehicles and an overview of a monitoring apparatus for monitoring the vehicles according to a preferred embodiment and method of the present invention.

Referring to FIG. 2 there is shown a plurality of moveable objects, for example trucks 200–203 travelling over the earth's surface, and a monitoring apparatus comprising a base station 204 for receiving signals transmitted from the moveable objects 200–203, and a monitoring station 205 in communication with the base station 204 over the public switched telephone network 206.

Each truck communicates with the base station 204 via a radio link. The monitoring station 205 is in communication with the base station 204 over the PSTN 206 for sending signals from the monitoring station for transmission by the base station 204, and for communicating radio signals received by the base station 204 back to the monitoring station 205.

Figure 3:
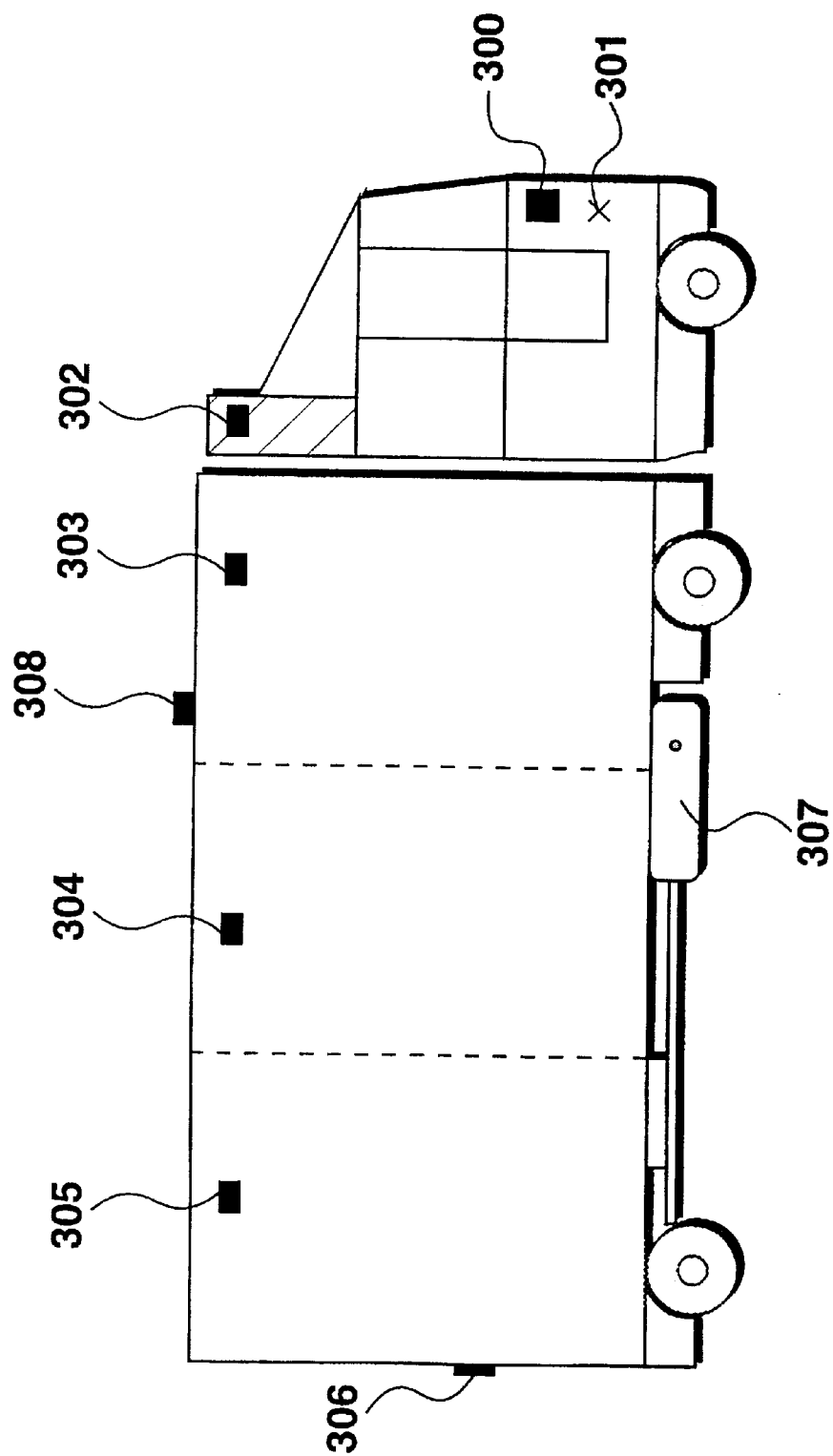
FIG. 3 illustrates a vehicle fitted with a data collection unit and associated sensors and actuators comprising the preferred embodiment.

Referring to FIG. 3 herein, there is shown a truck fitted with items of monitoring apparatus according to the preferred embodiment of the present invention. Monitoring apparatus fitted to the truck comprises a data collection unit 300, a plurality of sensors 301–307 for sensing operations of the truck, the sensors connected to the data collection unit 300; and a radio receiver 308.

The sensors positioned around the truck may sense operations of the truck such as fuel level; opening and closing of vehicle body doors; operation of a vehicle refrigeration unit; temperature within individual compartments of a vehicle body; engine oil temperature; oil pressure; tachograph readings; tyre pressure; odometer readings.

There may also be provided one or more actuators controlled by the data collection unit 300, for example an engine immobiliser unit, or an alarm unit actuator (not shown).

Figure 4:
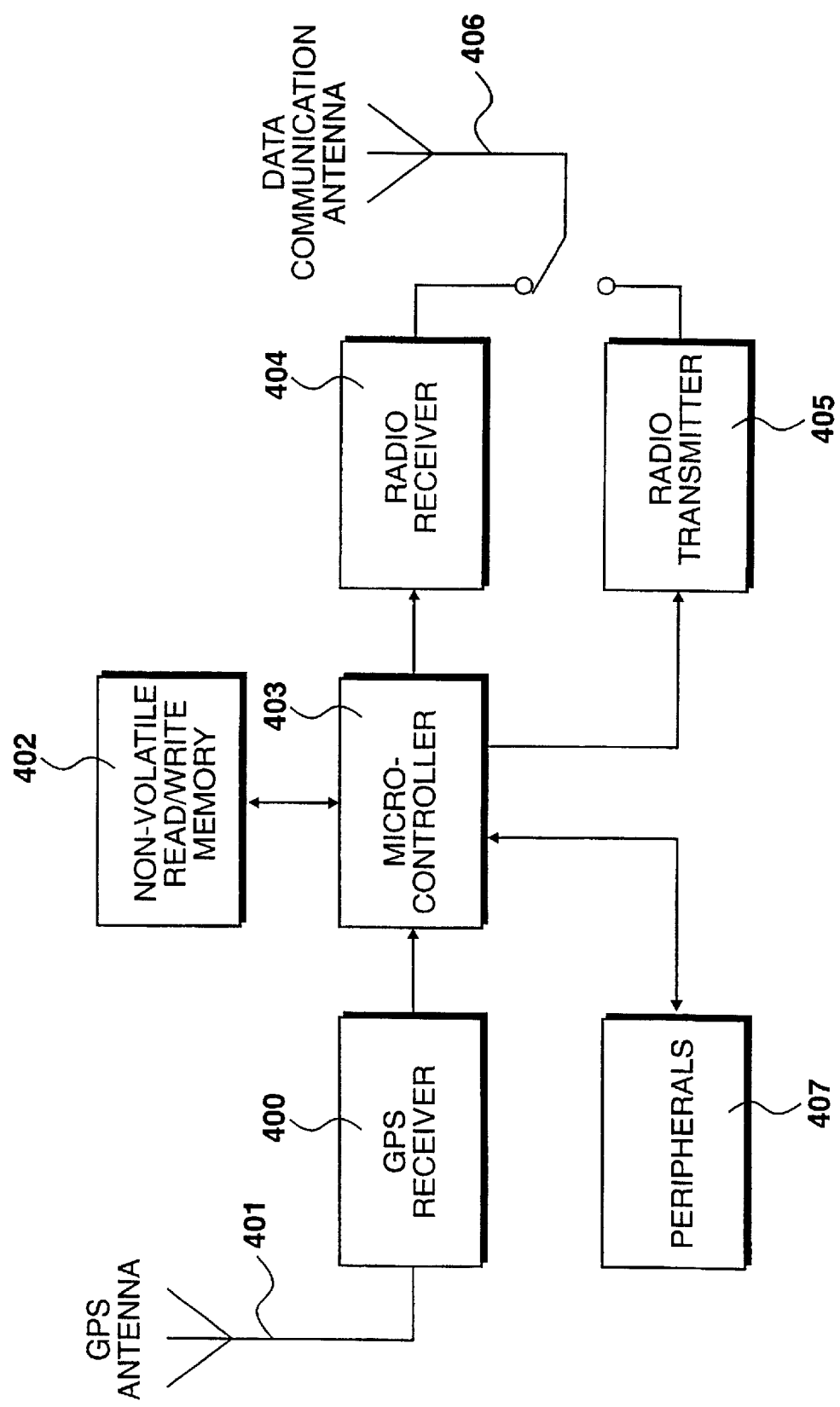
FIG. 4 illustrates an arrangement of the data collection unit of FIG. 3.

Referring to FIG. 4 a data collection unit 300 comprising a GPS receiver 400 connected to an antennae 401: a non volatile read-write memory 402, a micro controller 403, a radio receiver 404 and radio transmitter 405 connected to a data communication antennae 406; the micro controller being connected to a plurality of peripherals 407 comprising the aforementioned sensors and actuators (not shown).

Figure 5:
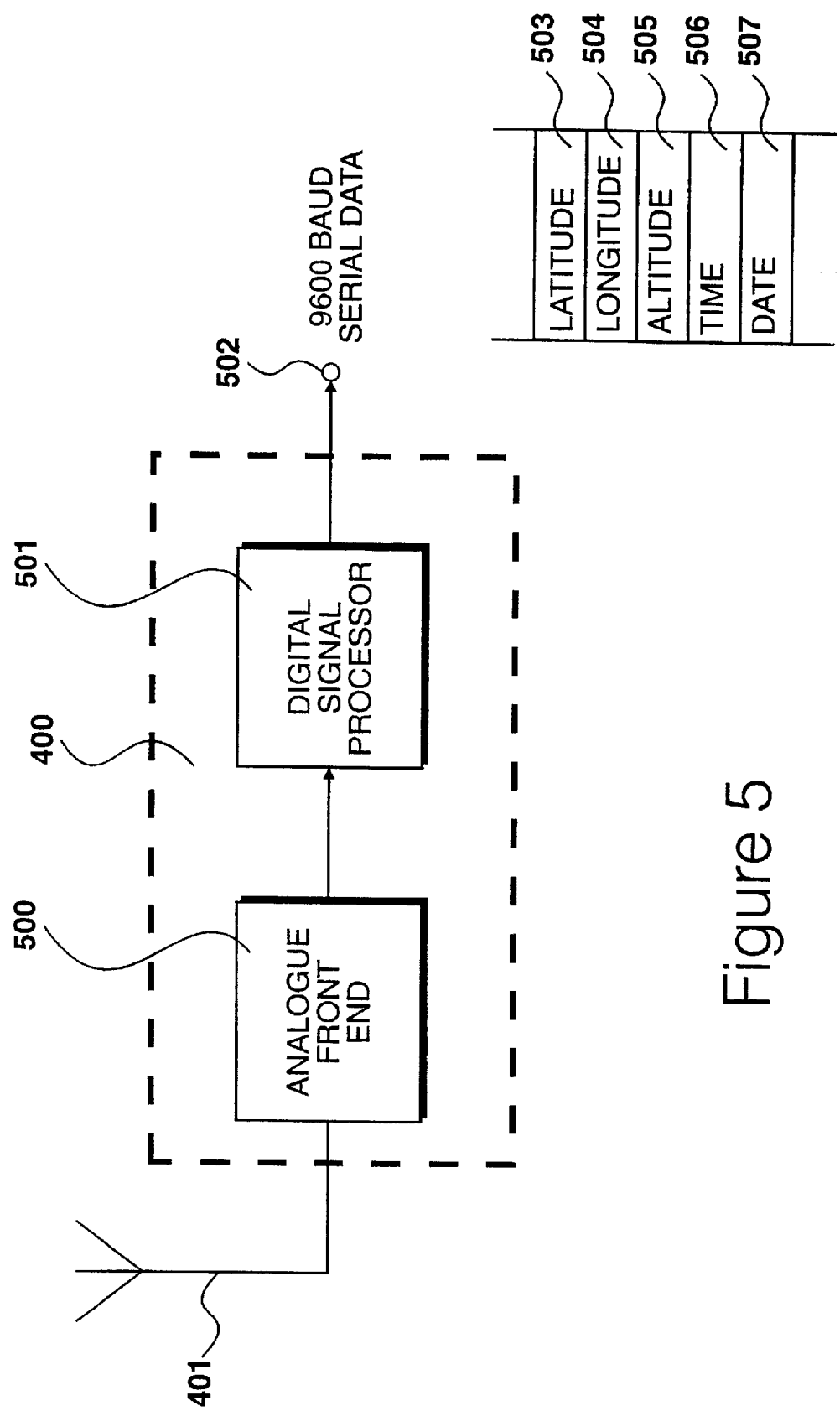
FIG. 5 illustrates a GPS receiver comprising the data collection unit of FIG. 3.

Referring to FIG. 5, the GPS receiver 400 comprises an analogue front end amplification section 500 capable of receiving signals from 12 satellites simultaneously, and a digital signal processor 501 receiving signals from the analogue front end amplifier and outputting a serial data stream at 9,600 baud rate, from output 502 the serial data including geographical positional data in terms of latitude, longitude and altitude coordinates, and time and date data 503–507 respectively.

Referring to FIGS. 4 and 5, the micro controller 403 continually receives the position and time data from the GPS receiver 400 as the truck travels and parks and periodically stores the position and time data in the memory 402 at predetermined intervals. Sensor data from each of the sensors on the truck is available to the micro controller 403 either continuously, or in response to poll signals. In the preferred embodiment, the memory 402 comprises a 32 kilobyte non volatile read write memory for example a 62256 static RAM with low leakage reservoir capacitor. The micro controller in the preferred embodiment comprises an Intel 80C51 micro controller.

Position data comprising a latitude data and a longitude data, and time and date data is abstracted from the byte stream data produced at the output 502 of GPS receiver 400 by the micro controller 403. The micro controller 403 has a set of registers into which the position and time data is written once every second. The set of registers always contains the most recent position and time/date data. The micro controller is configured in accordance with settable control instructions to log the current position and date/time data held in the registers, in the non volatile read write memory 402. The read write memory 402 accumulates a set of records, each comprising a position data and a corresponding time/date data. Each record, in addition to containing position and time/date data may also include data concerning other operational parameters of the vehicle, for example a fuel level data, an engine temperature data, door open/close data, vehicle body temperature data, fridge operating/non-operating data or the like, as contained in signals received from the on-board sensors of the vehicle.

As mentioned above, the time interval between successive loggings of the position and time/date data in the memory 402 may be pre-set. In the preferred embodiment, data is stored at intervals of one minute, but the interval can be varied in the range for example 30 seconds to ten minutes, the period being selected so as to provide the required positional resolution of the tracking of the vehicle. Additionally, position data may be stored in the memory 402 in response to an aperiodically occurring event such as a sensor signal. In this case, a record of the sensor signal along with the appropriate position and time data is stored in memory 402.

Positional data is logged in the memory 402 as 24-bit words. Each word represents a particular information type and a set of information types is illustrated in FIG. 6. The information types comprise a date 601, a start time 602, a stop time 603, an absolute latitude 604, an absolute longitude 605 and a relative latitude and longitude combined into a single 24-bit word, 606. In the preferred embodiment, the altitude data contained in the GPS data is discarded.

A first grouping of bits represents the information type, with a second grouping representing the information itself and a division between these two groupings is illustrated by line 607. An absolute latitude 604 and an absolute longitude 605 require a total of 22-bits, represented as T bits and G bits respectively. An absolute longitude is identified by type code 10 and this distinguishes it from an absolute longitude having type code 11.

After an absolute longitude and an absolute latitude have been recorded, subsequent positional data is stored as a relative latitude and longitude, by subtracting the absolute values previously recorded from a present position. This provides a level of compression such that only 11-bits are required for the relative latitude with a further 11-bits being required for the relative longitude. A word of this type is identified by word type code 01.

Word type code 00 precedes the other three types of words which are then uniquely defined by lower significant bits 17 to 21. It can be appreciated that the provision of this number of bits for identifying word types allows other types of words to be recorded, which may be reserved for user-specific information. Thus, bits 17 and 18 are used to distinguish a date, a start time and a stop time, with bits 0 to 16 being used to convey the associated data.

As shown in FIG. 6, a typical data set would be initiated with the recording of the date. This would be followed by a start time which is then followed by an absolute latitude and an absolute longitude. While the vehicle remains in motion, relative values may be recorded and, under normal operating conditions, words of type 606 would constitute the bulk of the stored information, thereby obtaining maximum advantage from the compression provided by this word type. When the vehicle stops, the device would record a final absolute latitude and an absolute longitude and the data set would be terminated by a stop time and again the date. Thus, short journeys result in relatively small data sets with larger journeys producing larger data sets.

Although the data stream issuing from the GPS receiver 400 contains absolute geographical positional data in terms of data describing a full latitude and longitude co-ordinate, by storing difference data instead of absolute latitude and longitude positional data, the memory requirement for storing a record can be reduced. In addition, an absolute positional data may be stored in the memory in response to an aperiodic stimuli for example a signal issued by the truck ignition when the ignition is turned on, and used as a reference from which to determine absolute position data from the difference data.

Figure 7:
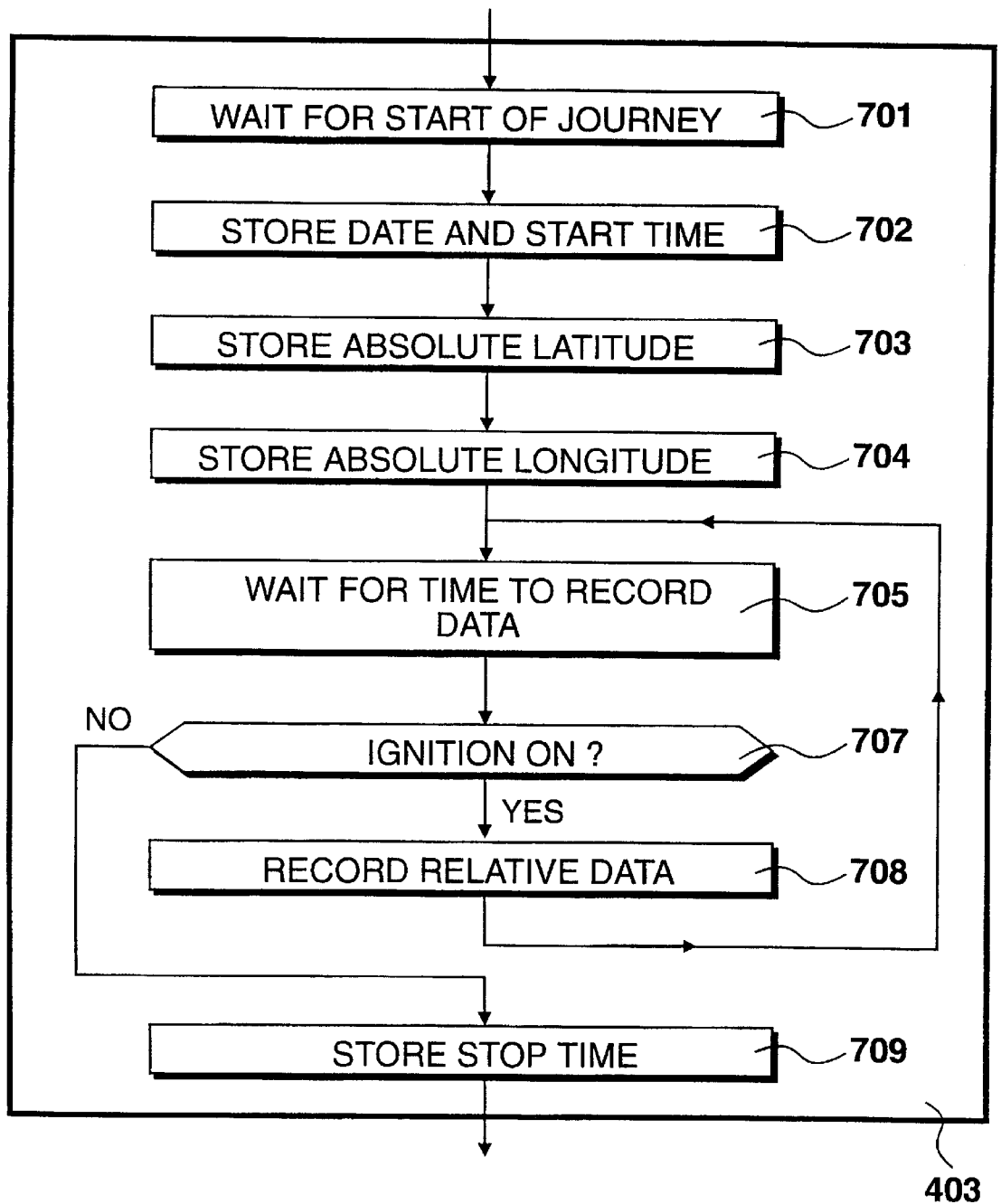
FIG. 7 details the data collection method identified in FIG. 6, configured to store data using the format identified in FIG. 7.

The process according to the preferred embodiment by which the micro-controller governs the logging of data in the memory 402 is shown in FIG. 7 in which, at step 701, the micro-controller wafts for a signal to indicate the start of a loumney. This signal may be manually indicated e.g. by the driver operating a button or may be automatically detected by the monitoring, by the micro-controller, of a door or ignition switch. When the appropriate signal is received, the process moves to step 702 at which the date and time contained in the GPS data is logged in the memory 402. Next the process moves to steps 703 and 704 at which the absolute latitude and longitude data is logged in the memory 402. From step 704, the process moves to step 705 where the process enters a wait state. When a stimulus is received, as described above, indicating that further data should be logged then the process moves to step 707 at which the process checks whether the ignition switch is on. If the ignition switch is on this indicates that the journey is continuing and so the process moves to step 708 at which the relative positional data is logged as described above. After step 708, the process returns to step 705 to waft for the next stimulus indicating that data should be logged.

Eventually at step 707 the ignition switch will be detected as being off the process moves to step 709 at which point the stop time along with the absolute position data is stored in the memory 402 and the process returns to step 701.

Figure 8:
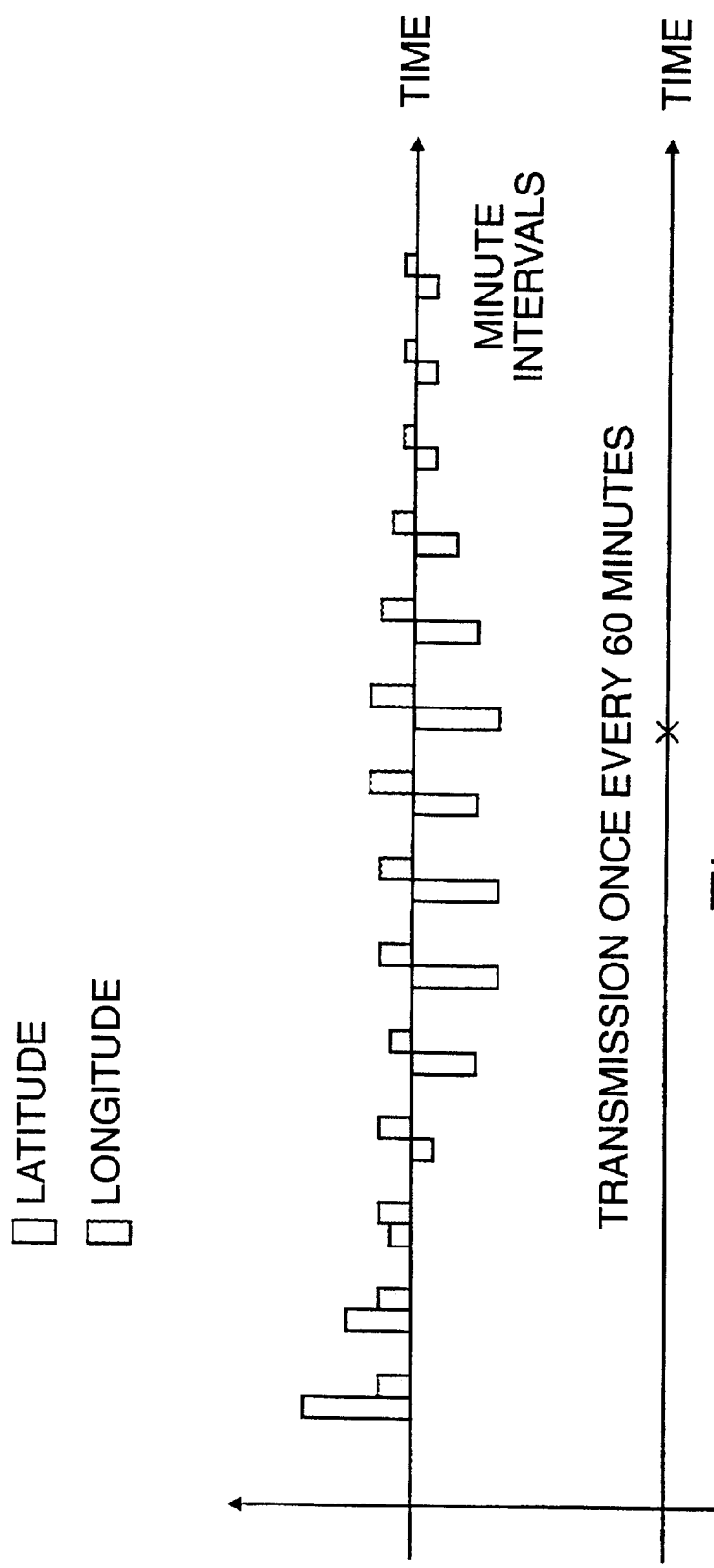
FIG. 8 illustrates transmission of positional signals in accordance with a preferred embodiment of the present invention.

Referring to FIG. 8 herein, there is shown transmission of data in accordance with the preferred embodiment in which real-time positional and time/date data together with optional sensor data are accumulated in the memory records 402 on board the vehicle. The data collection unit 300 accumulates data substantially in real-time until a transmission of accumulated data is triggered. Triggering of the transmission of accumulated data may occur in response to a periodic stimulus, e.g. every hour.

In addition to the transmission of stored real-time data from the memory 402 at the regular periodic tranmission intervals, as mentioned above, data may be transmitted under control of the processor from the memory 402 in response to aperiodic everts or operations of the vehicle. Such events or operations which occur aperiodically may include events such as opening of the rear doors of the vehicle, a temperature of a vehicle body exceeding a predetermined limit, fuel levels exceeding a predetermined limit, turning on or turning off the ignition of the vehicle, or other predetermined events measured by sensors attached to the vehicle. Examples of such conditions are shown in FIG. 9.

Figure 10:
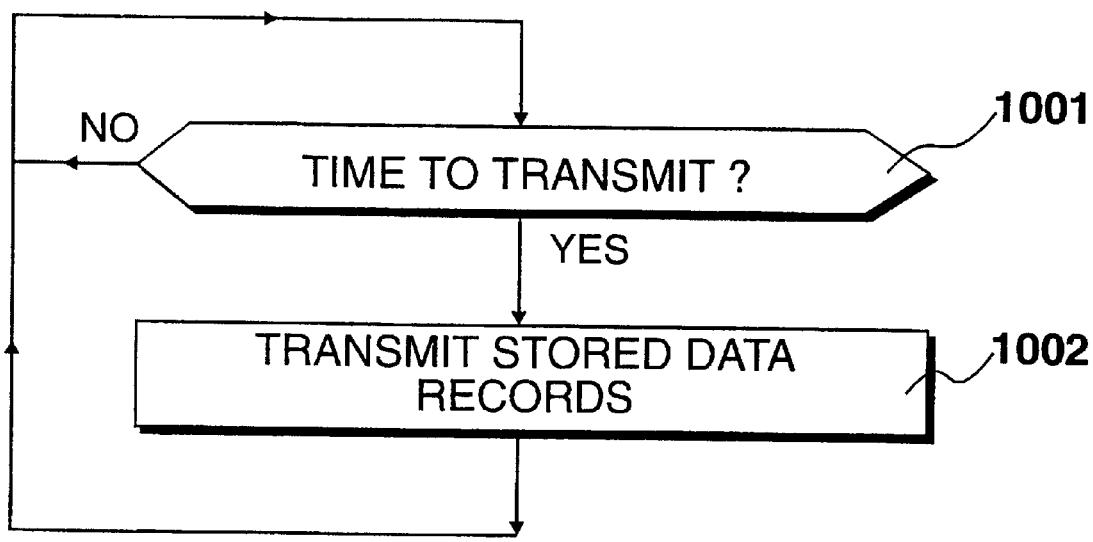
FIG. 10 illustrates further operations of the data collection unit.

FIG. 10 shows the micro controller process when arranged to transmit the stored data at predetermined time interval. At step 1001, the micro controller 403 determines whether the appropriate interval has passed and, if so, then at step 1002 transmits the stored data records via the radio transmitter 405 and data communication antennae 406. Thereafter, control is returned to step 1001.

Figure 11:
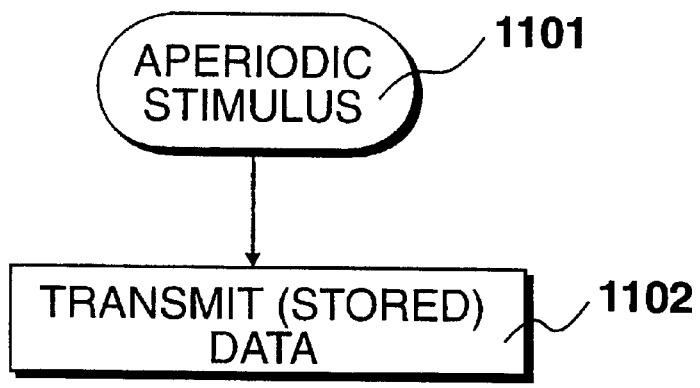
FIG. 11 illustrates an operation of the data collection unit in response to an aperiodic stimulus.

FIG. 11 shows the micro controller process when arranged to transmit data in response to an aperiodic stimulus, such as a sensor signal as mentioned above. At step 1101 the process waits for the stimulus and when such a stimulus is received, moves to step 1002 to transmit stored data from the memory 402 via the radio transmitter 405 and data communication antennae 406.

By transmission of the contents of the memory 402 in accordance with the above conditions, data transmissions can be reduced. Thus, occupancy of communication channels between the vehicles and the base stations may be optimised and the ratio of positional, time and sensor data transmitted in proportion to the protocol overhead of the transmission channel can be improved. It will be appreciated that where there are a large number of moveable objects to be monitored, reduction in the amount of connections and disconnections of communication channels per unit of data transmitted is desirable from a technical point of view in simplifying processing requirements and complexity of equipment.

Figure 12:
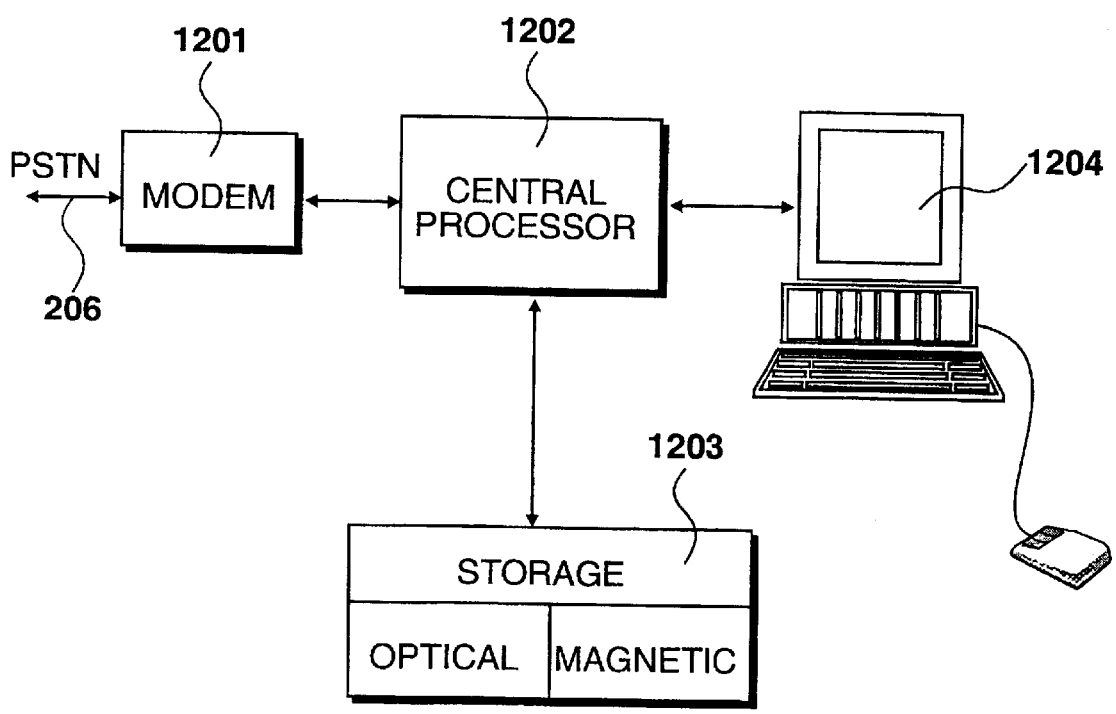
FIG. 12 illustrates a remote monitoring station apparatus according to the preferred embodiment of the present invention.

Referring to FIG. 12, there is shown an arrangement of the monitoring apparatus at the monitoring station 205. The apparatus comprises a modem 1201 for receiving data over the public switch telephone network 206 from the control cantre 204. The monitoring apparatus further comprises a central processor 1202 for processing received data, a storage device 1203 for storing the received data and map data, and a user interface 1204 comprising a display device in the form of a monitor, a keyboard entry device, and a pointing device.

What is claimed is:

1. A method of monitoring a geographically moveable object, said method comprising:

substantially continuously receiving geographic position data at said geographically moveable object;

recording a first set of data representing the absolute geographic position of said object at a first position;

creating relative position data from a difference between the absolute position data of a given position and the position data of a different preceding recorded position; and recording a second set of position data representing a second position of said object relative to said first position.

2. A method as in claim 1, further comprising recording subsequent sets of relative position data representing subsequent positions of said object relative to an earlier recorded position.

3. A method as in claim 1, in which said absolute position data comprises two n-bit words and said relative position data comprises a one n-bit word.

4. A method as in claim 3 in which n=22.

5. A method as in claim 1, further comprising recording corresponding time and date data associated with said position data.

6. A method as in claim 1, wherein said position data is recorded at intervals ranging from 30 seconds to 30 minutes.

7. A method as in claim 1, wherein said position data is stored at intervals ranging from 2 minutes to 10 minutes.

8. A method as in claim 1, wherein the movable object is a vehicle and recording of said data is initiated by the vehicle ignition being activated.

9. A method as in claim 1, in which a further set of data representing the absolute geographic position of said object is recorded in response to the movement of the vehicle ceasing.

10. A method as in claim 1, in which further data is recorded in response to operational events of said movable objects, said data representing at least one of said operational events.

11. A method as in claim 10, in which position data is recorded in association said at least one of said operational events data, said position data representing the geographical position at which said event occurred.

12. A method as in claim 1, further comprising transmitting said recorded data to a base station to provide a history of the movement of said object at said base station.

13. A method as in claim 12, wherein said recorded positional data is transmitted in response to a periodic or an aperiodic signal.

14. A method as in claim 12, in which said transmitting of said position data is activated in response to a signal generated in response to an operation of said moveable object.

15. A method as in claim 13, wherein said transmitting is activated in response to a received interrogation signal.

16. A method as in claim 13, wherein said transmission of data from said geographically moveable object commences in response to a received geographical position data.

17. A method as in claim 13, in which the transmitting of said recorded data is performed at predetermined time intervals.

18. A method as in claim 13, wherein the transmitting of recorded data is performed over an open radio channel.

19. A method as in claim 13, wherein the transmitting of position data comprises transmission over a mobile telephone communications channel.

20. A method as in claim 1, in which said geographic position data is data created by a Geographic Positioning System (GPS).

21. Apparatus for monitoring a geographically moveable object, said apparatus comprising:
  means for substantially continuously receiving geographic position data at said geographically moveable object;
  means for recording a first set of data representing the absolute geographic position of said object at said first position;
  means for creating relative position data from a difference between an absolute position data of a given position and the position data of a different preceding recorded position; and
  means for recording a second set of position data representing a second position of said object relative to said first position.

22. Apparatus as in claim 21, further comprising means for recording subsequent sets of relative position data representing subsequent positions of said object relative to the immediately preceding recorded position.

23. Apparatus as in claim 21, in which said absolute position data comprises two n-bit words and said relative position data comprises a one n-bit word.

24. Apparatus as in claim 23, in which a number n of said n-bit words is equal to a value of twenty-two.

25. Apparatus as in claim 21, further comprising means for recording a corresponding time/date data associated with said position data.

26. Apparatus as in claim 21, arranged to record said position data of intervals ranging from 30 seconds to 30 minutes.

27. Apparatus as in claim 21, arranged to record said position data at intervals ranging from 2 minutes to 10 minutes.

28. Apparatus as in claim 21, wherein the movable object is a vehicle and the recording of said data is initiated by the vehicle ignition being activated.

29. Apparatus as in claim 21, arranged to record a further set of data, representing the absolute geographic position of said object, in response to the movement of the vehicle ceasing.

30. Apparatus as in claim 21, in which further data is recorded in response to operational events of said movable object, said data representing at least one of said operational events.

31. Apparatus as in claim 30, in which position data is recorded in association said at least one of said operational events data, said position data representing the geographical position at which said event occurred.

32. Apparatus as in claim 21, further comprising means for transmitting said recorded data to a base station to provide a history of the movement of said object at said base station.

33. Apparatus as in claim 32, wherein said transmitting means is operable to transmit recorded positional data in response to a periodic or an aperiodic signal.

34. Apparatus as in claim 32, in which said transmitting means is operable to transmit said position data in response to a signal generated as a result of an operation of said moveable object.

35. Apparatus as in claim 32, wherein said transmitting means is operable to transmit said data in response to a received interrogation signal.

36. Apparatus as in claim 32, wherein said transmitting means is operable to transmit said data in response to a received geographical position data.

37. Apparatus as in claim 32, in which the transmitting means transmits said data at predetermined time intervals.

38. Apparatus as in claim 32, wherein the transmitting means utilizes an open radio channel to transmit said data.

39. Apparatus as in claim 32, wherein the transmitting means utilizes a mobile telephone communications channel to transmit said data.

40. Apparatus as in claim 32, in which said geographic position data is data created by a Geographic Positioning System (GPS).

41. A method of monitoring a geographically moving object, said method comprising:
  (a) generating n-bit digital data signals representing a sequence of absolute geographic positions of said object and recording at least one of said n-bit signals;
  (b) generating a series of m-bit digital data signals, each representing a relative object geographic position based on a calculated difference between one of said further n-bit digital data signals and an earlier generated n-bit digital data signal, m being an integer that is less than n; and (c) recording said m-bit digital data signals thereby reducing the amount of recorded data representing historical past geographical positions of said object.

42. Apparatus for monitoring a geographically moving object, said means comprising:

(a) means for generating n-bit digital data signals representing a sequence of absolute geographic positions of said object and recording at least one of said n-bit signals;

(b) means for generating a series of m-bit digital data signals, each representing a relative object geographic position based on a calculated difference between one of said n-bit digital data signals and an earlier generated n-bit digital data signal, m being an integer that is less than n; and (c) means for recording said m-bit digital data signals thereby reducing the amount of recorded data representing historical past geographical positions of said object.

\* \* \* \* \*